United States Patent [19]

Tokerud et al.

[11] Patent Number: 5,464,573
[45] Date of Patent: Nov. 7, 1995

[54] LIQUID COLLECTOR-DISTRIBUTOR WITH INTEGRAL EXCHANGE COLUMN AND METHOD

[75] Inventors: Pamela J. Tokerud; Darrin S. Muggli, both of Wichita, Kans.

[73] Assignee: Koch Engineering Company, Inc., Wichita, Kans.

[21] Appl. No.: 239,559

[22] Filed: May 9, 1994

[51] Int. Cl.[6] .................................................. B01F 3/04
[52] U.S. Cl. ..................................... 261/97; 261/DIG. 85
[58] Field of Search ...................... 261/97, 110, DIG. 85

[56] References Cited

U.S. PATENT DOCUMENTS

| | | | |
|---|---|---|---|
| 2,394,133 | 2/1946 | Zimmerman | 261/110 |
| 3,290,024 | 12/1966 | Huber | 261/97 |
| 4,427,605 | 1/1984 | Meier et al. | 261/97 |
| 4,432,913 | 2/1984 | Harper et al. | 261/97 |
| 4,479,909 | 10/1984 | Streuber | 261/97 |
| 4,521,350 | 6/1985 | Lefevre | 261/DIG. 85 |
| 4,557,877 | 12/1985 | Hofstetter | 261/97 |
| 4,816,191 | 3/1989 | Berven et al. | 261/97 |
| 4,839,108 | 6/1989 | Silvey | 261/97 |
| 4,994,210 | 2/1991 | Lucero et al. | 261/97 |
| 5,132,055 | 7/1992 | Alleaume et al. | 261/97 |
| 5,227,095 | 7/1993 | Curtis | 261/DIG. 85 |
| 5,244,604 | 9/1993 | Miller et al. | 261/97 |

OTHER PUBLICATIONS

Norton, "Packed Tower Internals", Norton Co. Brochure, 1974–1977, 21 pages, 261–97.
Mellatech, "Mellatech Column Internals™", Sulzer Chemical, Oct. 8, 1992, Brochure No. 22.5106.40, v. 91.50, 24 pages, 261–97.
Chen, "How Packing Stacks Up", Chemical Eng., Mar. 5, 1984, 16 pp. 261–97.

Primary Examiner—Tim R. Miles
Attorney, Agent, or Firm—Richard P. Crowley

[57] ABSTRACT

A compact heat or mass transfer exchange column containing a plurality of vertically spaced-apart sections to define a column space therebetween and at least one integral collector-distributor device in the open space for the collection and distribution in the column of a downwardly flowing liquid. The device comprises a plurality of lateral collection and distribution troughs extending from the central channel or sump to distribute downwardly flowing liquid to a lower section. The lateral trough contains a plurality of removably secured, angled vane elements connected to the upper edges of the lateral troughs, the vanes extending over the open space between the lateral troughs to receive downwardly flowing liquid on the upper surfaces thereof and to direct the downwardly flowing liquid into the lateral troughs, and optionally a wall wiper ring to direct liquid from the internal walls of the column into the collector-distributor device.

19 Claims, 4 Drawing Sheets

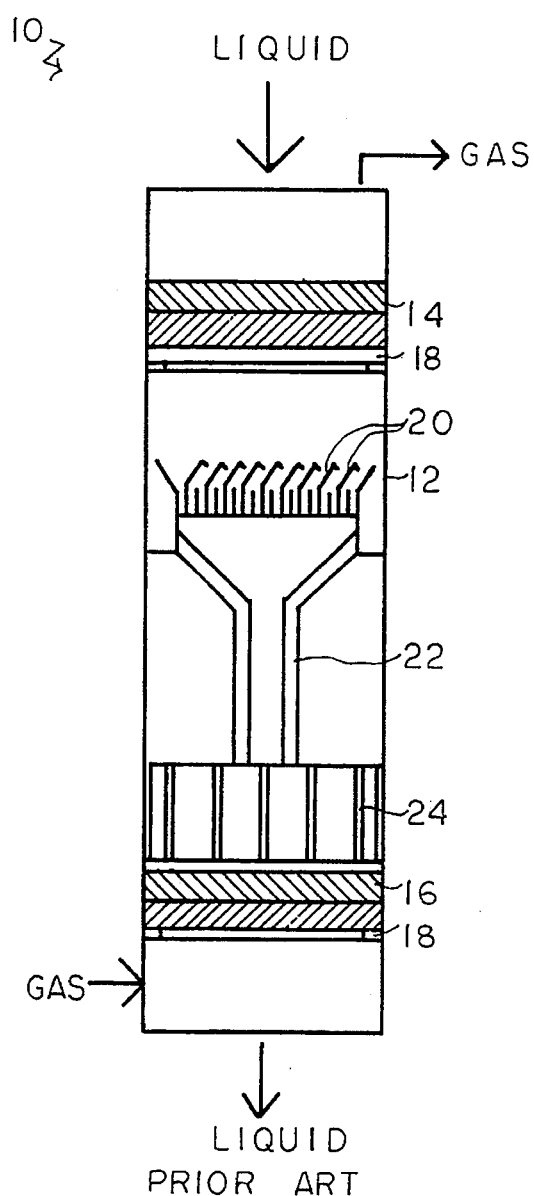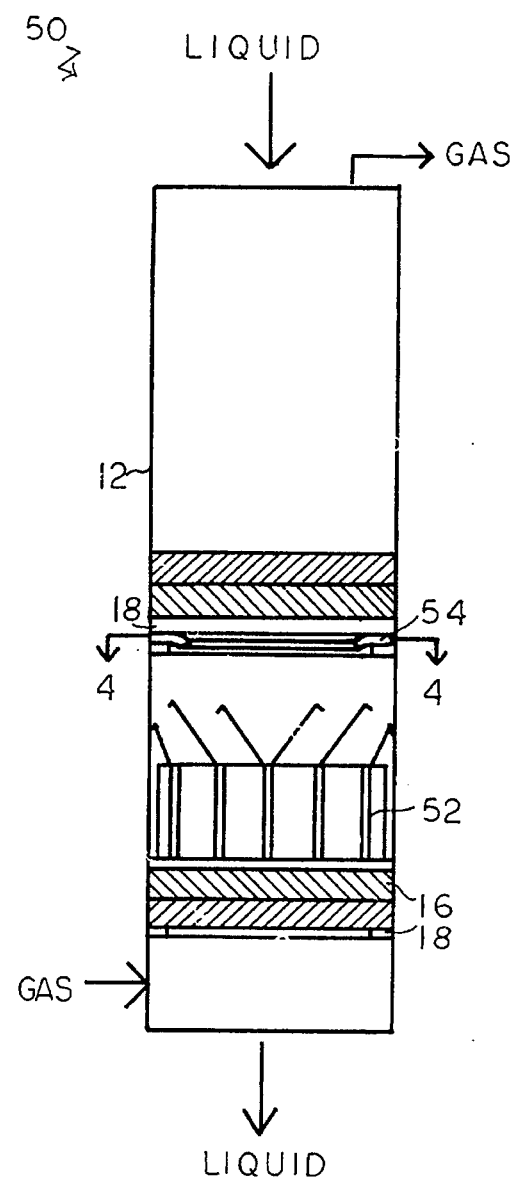

LIQUID COLLECTOR-DISTRIBUTOR WITH INTEGRAL EXCHANGE COLUMN AND METHOD

BACKGROUND OF THE INVENTION

Exchange columns are typically employed for heat or mass transfer operations, such as, but not limited to, distillation, absorption, stripping, rectification or other chemical or process treatments between a gas and a liquid, such as when a downwardly flowing liquid in a column engages with an upwardly flowing gas to provide an exchange relationship between the gas and liquid. Such heat exchange or mass transfer exchange columns contain, vertically arranged and spaced-apart, various mass transfer beds or sections, which sections or beds would be composed, for example, of a plurality of random packing such as rings, saddles or other such loosely filled, nonstructured packing, or structured packing, such as a designed, corrugated, contacting metal, ceramic or plastic sheets placed in an angle to each other. The random or structured packing may be employed in separate packed beds or mixed in packed beds, and usually there would be a plurality of packed beds vertically arranged throughout the exchange column with space between the beds.

In the column space between the mass transfer or bed sections, there is generally disposed beneath a packed bed or section a liquid collector, whose purpose is to collect the downwardly flowing liquid from the upper bed or section and to direct the liquid into a center channel of a separate, spaced-apart, liquid distributor beneath the liquid collector. For example, the collector would be disposed directly beneath the lower section of the packed bed or section and would comprise, for example, a plurality of upwardly-extending, parallel vanes and separate channels, so that the downwardly flowing liquid would flow onto the surface of the vanes and into the channels and then be directed to a collector ring about the internal diameter of the column and then downwardly in pipes to the center-most distribution trough of a separately positioned and spaced-apart liquid distributor for the collected liquid.

Such exchange columns include a separate liquid distributor placed below the liquid collector and designed to receive the outflow from the liquid collector within the center trough or channel of the liquid distributor. Usually, such liquid distributors would provide a central channel, open at the top and having a plurality of spaced-apart, parallel, lateral, troughs extending outwardly therefrom and with the central channel and lateral troughs providing for the generally uniform distribution of the collected liquid onto the upper surface of the packed bed or section usually directly below the liquid distributor. The liquid distributors are designed to provide for the generally uniform flow over the entire cross-sectional area of the lower packed bed or section, through, for example, the use of drip tubes emanating from the side of the lateral channels, or splash or drip plates, or holes in the side of the channel or holes in the bottom of the channel, or any combination thereof. The employment of separate, vertically arranged, spaced-apart, vane-type collectors and separate, spaced-apart, downstream, liquid distributors in exchange columns are well-known and well-utilized.

It is desired to provide for a new and improved, compact, integral liquid collector-distributor in an exchange column which permits a reduction in height of the exchange column or saves internal column space, reduces the cost of manufacturing and installation of the collector-distributor device and otherwise provides for additional advantages in the efficiency and method of operating the exchange column.

SUMMARY OF THE INVENTION

The invention relates to an exchange column having a liquid collector-distributor and a method of operation. In particular, the invention concerns a packed bed column having an integral liquid collector-distributor device therein, and a method of operating such a column.

The invention concerns an integral liquid collector-distributor device designed for use in a heat or mass transfer exchange column, which is positioned between spaced-apart, random or structured packed beds or mass or heat transfer sections of the column. The integral collector-distributor is designed to collect downwardly flowing liquid from the upper section of a column, typically from a packed bed, and to redistribute efficiently the downwardly flowing liquid so collected to a packed bed below the collector-distributor. The invention includes an improved exchange column, which column includes an inlet for the introduction of a liquid into the upper portion of the column, an outlet for the withdrawal of a treated liquid from the lower portion of the column, an inlet for the introduction of an upwardly flowing gas in the lower section of the column, and an outlet for the withdrawal of the gas from the upper section of the column.

The column includes a plurality of mass or heat transfer sections, such as and typically of beds with random or structured packing, or a combination thereof, spaced apart and vertically arranged within the column, and generally would include an upper packed bed or another device, such as, for example, but not limited to, an overhead condenser, such as a tube bundle to treat liquid and provide for downwardly flowing liquid, and a spaced-apart, lower packed bed, to define a column space between the upper bed or condenser and the lower packed bed within the column.

The column includes an integrally manufactured and formed aligned distribution means liquid-distributor collector device within at least one column space, which device comprises one or more central collector-distributor channels having upward sides and an open top and extending substantially across the diameter of the column, and adapted to receive therein downwardly flowing liquid from the upper sections of the column, and additional collector-distributor means, which includes a plurality of generally narrow, elongated, spaced-apart, generally parallel, aligned, lateral liquid collection and distribution troughs extending generally perpendicularly outward from one or more of the central channels, and extending substantially across the column on either side of the central channels. The lateral troughs have open tops and upwardly extending sides and side edges, and contain means therein to distribute the collected liquid, generally uniformly across and onto the top of the lower packed bed in the column.

Thus, the liquid distributor means may comprise one or a plurality of central channels with lateral troughs extending outwardly from the center-most trough. The distribution means also may comprise a plurality of lateral troughs and/or center-most channels with an annular sump about the internal surface of the exchange column. The center-most channels and sump are all connected to the lateral troughs and serve to equalize the level of liquid in the lateral troughs. Generally, all the lateral troughs will have means to distribute liquid, and not just the central channel.

The device includes a collection means to collect liquid from an upper section of the column, such as directly from the packed bed, and to direct the liquid so collected into the central channel and lateral troughs of the distribution means as required. The collection means includes the troughs and a plurality of elongated, angled, vane elements, the vane elements at one end secured to the upper side edges of the central channel and lateral troughs and extending upwardly at an angle to the longitudinal axis of the column, and optionally and preferably having a short, downwardly angled vane extension at the upper end thereof, the vane elements generally aligned in a parallel manner and extending outwardly at a sufficient angle to cover the open space between the adjacent central channel and lateral troughs. The vane elements are adapted to receive on their upper surfaces the downwardly flowing liquid from the upper section above, and to direct the received liquid into the center-most channel and/or lateral troughs of the liquid distribution means, for distribution to the lower packed bed section.

The exchange column can also include wall wiper means positioned above each integral liquid collector-distributor device, typically just below the upper packed bed or section to receive and direct liquid from the internal wall of the column inwardly for collection and distribution by the liquid collector-distributor device. The wall wiper means may comprise a scalloped inner ring and a column wall support means with a plurality of peripheral, short, inwardly-directed and downwardly-angled sections to receive liquid from the wall and direct it inwardly and onto the respective center-most or lateral troughs of the collector-distributor device. The wall wiper may constitute a 360° ring clamped to a support ring used by the packed bed support situated above the vane elements of the wall wiper device, typically to be wider at the end of the laterals to ensure that all the downwardly flowing liquid near the internal wall of the column is routed inwardly into the collector-distributor device.

The column may also include an annular sump connected to the lateral troughs, which sump receives liquid from the internal wall of the column, and directs the collected wall liquid to the lateral troughs.

The vane elements of the collector-distributor device used in the column are secured to the upper edge of the lateral troughs and usually are removably secured, such as being bolted, to the upper edge of the lateral troughs, and generally extended in an aligned angle outwardly from the center-most lateral trough, and may have all of the same angles, although the angles may vary as desired. The vane elements should be so angled and of sufficient height so as to cover the open space between the center-most or lateral troughs. Generally, the open space may vary, but, for example, is from about 3 to 12 inches, preferably 3 inches, with the height of the vane sections variable as desired, but generally ranging from about 4 to 16 inches. In one embodiment, a center-most trough employs two separate vane elements, one on each upper edge, one vane element extending in one angled direction and the other vane element extending in the other opposite angled direction, though of course, if desired, all vane elements may be extended in a single direction. Where desired, the downwardly disposed edges of the short vane extension can be serrated, notched or treated to form a plurality of separate drip points.

In addition, two or more of the vane elements may be secured together, such as at their upper edges in order to provide for increased mechanical support for the vanes. For example, a mechanical support means may comprise a vertically upright sheet material disposed in slots in the upper section of the vane elements, the sheet material extending between a plurality of the vane elements, and may, for example, be welded or bolted into place to provide additional mechanical support to retain the vane elements in the proper angled position, with the end of the sheet material extending to the wall of the column. The mechanical support means may be employed on all or only a portion of the vane elements. As designed, the downwardly flowing liquid, for example, from the upper packed bed would then fall directly into the central channel and lateral troughs, onto the internal wall where it is directed by the wall wiper means into the collector-distributor device, or into the annular sump ring and directed to lateral troughs, or onto the upper surfaces of the vane elements, either the elongated surface or the short vane extension surface, and be directed on one side into the lateral or center-most lateral trough to which the vane element has been secured and with the short extension element the liquid received thereon would flow into the open section of the adjacent trough. In this manner, all of the downwardly flowing liquid is efficiently collected and directed into a liquid distributor means of the integral collector-distributor device used in the exchange column.

The vane elements may be disposed at various angles from the upper edges of the lateral troughs, for example, the angle may range from the longitudinal axis of the column about 30° to 60° and sufficient to cover the lateral space between the next adjoining lateral distribution trough, while generally all vanes will be at the same angle.

The collector-distributor device may also include an external liquid feed means to provide directly external liquid into the central channel, such as by the use of a perforated pipe extending over the open section of the central channel, or an elbow pipe at or near the mid-point of the central channel, or directly into either one or the other end of the central channel. The lateral troughs are generally perpendicularly arranged and extend toward the internal walls of the column. The troughs may vary in height and spacing, but typically would have a height ranging from about 6 to 18 inches, and have a width ranging from about 1 to 6 inches. The lateral distribution troughs may have a variety of means in which to distribute the liquid received therein generally uniformly onto the packed bed below the lateral distribution troughs. Optionally, a plurality of the troughs would include slots or notches at the upper edges of the side walls of the lateral troughs for a liquid overflow, while the preferred flow to the packing would be via a variety of means, such as holes, in the bottom or on the sides, drip tubes or splash plates or other designs or devices to distribute the liquid therein. Generally, the mechanical support of the collector-distributor device is achieved either by a distributor support grid resting on the packing or secured to the column walls, or a vessel support ring secured to the internal wall of the column. Various means to provide for the distribution of the collected liquid from the center-most and lateral distribution troughs are set forth, for example, but not limited to, in U.S. Pat. No. 4,557,877 issued Dec. 10, 1985, U.S. Pat. No. 4,479,909 issued Oct. 30, 1984, U.S. Pat. No. 4,816,191 issued Mar. 28, 1989 and U.S. Pat. No. 4,994,210 issued Feb. 19, 1991, all of which are hereby incorporated by reference.

The heat and/or mass transfer exchange column may contain heat or mass transfer exchange devices located within the column and vertically spaced-apart to form one or more column open spaces therebetween. The device may include packed bed sections, either random or structured or a combination thereof, various types of distribution and gas-liquid contact trays and devices as well as heat exchange devices, alone or in a variety of combinations.

The employment of an integral collector-distributor device within an exchange column provides for a significant reduction in the internal column space between adjacent packed bed sections, thus enabling the height of the column to be reduced or additional treatment to be carried out in the column space, and further provides for a substantially reduced cost by the use of an integral device both in the manufacture of the integral device and the installation of the device within the column, all without any diminution in the overall efficiency of the collection and distribution of the liquid.

The invention includes a method of mass or heat transfer in an exchange column having at least two spaced-apart packed bed sections in the column to define a column space. The method includes introducing a liquid into an upper section of the column, introducing a gas into a lower section of the column, withdrawing a liquid-contacted gas from the upper section of the column, and withdrawing a gas-contacted liquid from the lower section of the column. The method includes providing an integral, collector-distributor device in the column space and receiving downwardly flowing liquid from the upper packed bed onto exposed, angled, extended surfaces of a plurality of upwardly extended, angled vane elements of the collector-distributor device, and directing such collected liquid directly from said surface into an open-top, center-most lateral trough to which a plurality of vane elements are secured at the upper edges and extend over the open space between the troughs. The method includes distributing the received and collected liquid from the liquid distribution means to the upper surface of the lower packed bed.

The invention will be described for the purposes of illustration only in connection with certain embodiments; however, it is recognized that various changes, modifications, improvements and additions to the illustrated embodiments may be made by those persons skilled in the art, all falling within the spirit and scope of the invention.

BRIEF DESCRIPTION OF THE FIGURES

FIG. 1 is a schematic illustration of a prior art, packed column with separate liquid collector and distributor apparatus therein.

FIG. 2 is a schematic illustration of a packed column with the collector-distributor of the invention.

DESCRIPTION OF THE EMBODIMENTS

Figure 3:
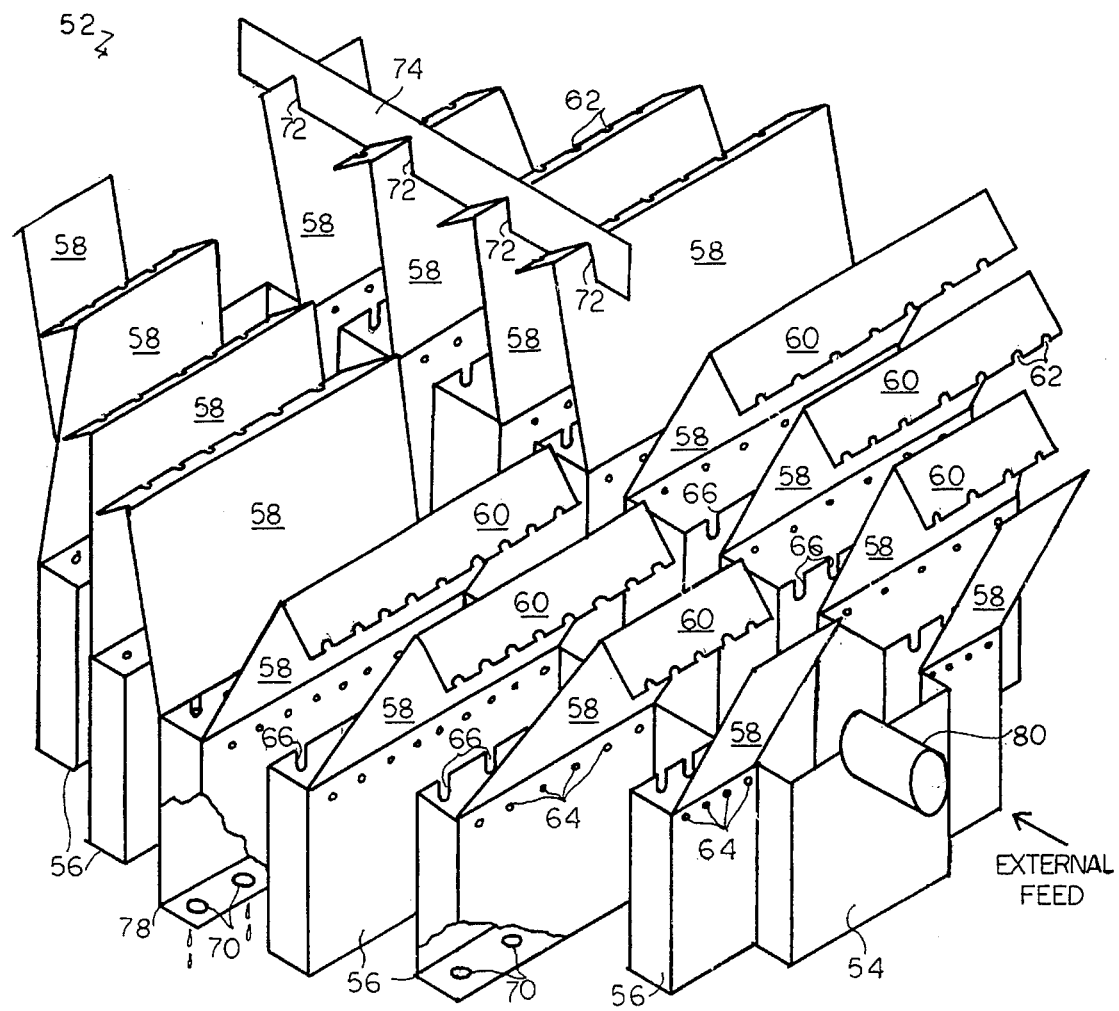
FIG. 3 is a perspective view from above of the integral collector-distributor device as shown in FIG. 2.

FIG. 1 is a schematic illustration of a prior art mass transfer column system 10 having a column 12 containing an upper structured packed bed 14 and a spaced-apart, lower structured packed bed 16, and which column 12 includes an inlet for the introduction of a liquid in the upper portion of the column, an outlet for the withdrawing of a liquid from the lower portion of the column, an inlet for the introduction of a gas into the lower section of the column and an outlet for the withdrawing of a gas on the upper section of the column. The column 10 includes a separate vane liquid collector composed of a plurality of generally angled plates or vanes 20 connected with downwardly extending pipes 22 extending into the top of a center-most channel distributor in a separate liquid distribution device 24 with lateral troughs to distribute the collected liquid onto the top surface of the structured packing bed 16.

Figure 4:
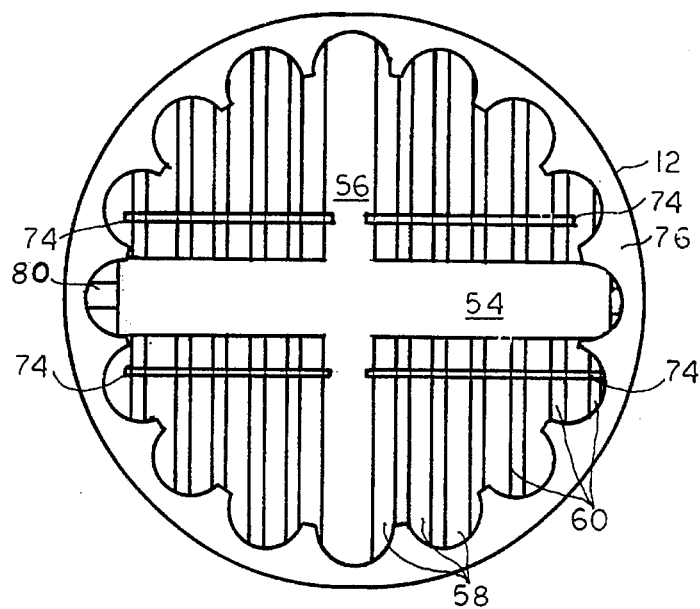
FIG. 4 is a top plan view along line 4—4 in FIG. 2 of the collector-distributor device and the column of the invention.

FIG. 2 is a schematic illustration of a mass exchange column system 50 employing a single, integral collector-distributor device 52, wherein the column 12 comprises, as in FIG. 1, an upper and lower packed bed section 14 and 16; however, the column space between the upper and lower packed beds within the column is significantly reduced by the employment of a single, integral collector-distributor device 52, and which integral collector-distributor device 52 is illustrated more particularly in FIGS. 3 and 4. Column 12 includes a wall wiper ring 54 to direct liquid from the internal wall surface of the column 12 downwardly and inwardly onto the high efficiency, collector-distributor device 52.

FIGS. 3 and 4 show a single integral collector-distributor device 52 having an open top, central channel 54 with upright sides and a plurality of lateral troughs 56 connected therewith and of varying lengths and extending generally to the inner wall of the column 12 with a center-most lateral trough 78, with a partial illustrative breakaway section showing drip holes 70 in the bottom of the center-most lateral trough 78, and also the lateral troughs 56 to distribute liquid onto the lower packed bed 16.

There is an external feed pipe 80 extending into the center-most distributor channel 54 to permit the introduction of liquid into the central channel 54. The lateral troughs 56 and 78 have a plurality of liquid overflow notches 66 along the upper edges of the sides of the troughs. The center-most lateral and lateral troughs 56 and 78 have angled, parallel, upright-sided sheet vanes 58 bolted by bolts 64 to the upper edge of the troughs 56 and 78 and angled to cover the open space between the lateral troughs 56 and having a short-sided, sheet, downwardly-angled vane extension 60 with serrated edges 62 at the downward end to act as drip points for the collected liquid. The vanes 58 collect downward flowing liquid on their exposed upper surfaces and direct the liquid into the lateral troughs 56 and 78, to which the vanes 58 are secured, while the vane extensions 60 direct liquid into the adjacent lateral trough 56. In the illustrated embodiment of FIGS. 2 and 3, the center-most lateral distributor trough 78 include vanes 58 on each upper edge and angled outwardly on each side. The central channel 54 and the center-most lateral distributor troughs 78 collect downwardly flowing liquid directly into the open top, while liquid which would tend to pass between the troughs is collected on the surface of the vane 58 and vane extension 60 and directed into the plurality of adjacent lateral troughs 56. As illustrated in the broken away section of FIG. 3, holes 70 in the bottom of the center-most lateral and the lateral troughs provide distribution of the collected liquid to the next lower packed bed 16. Liquid distribution may also be accomplished with drip tubes, splash plates and other means on or in the troughs.

Figure 5:
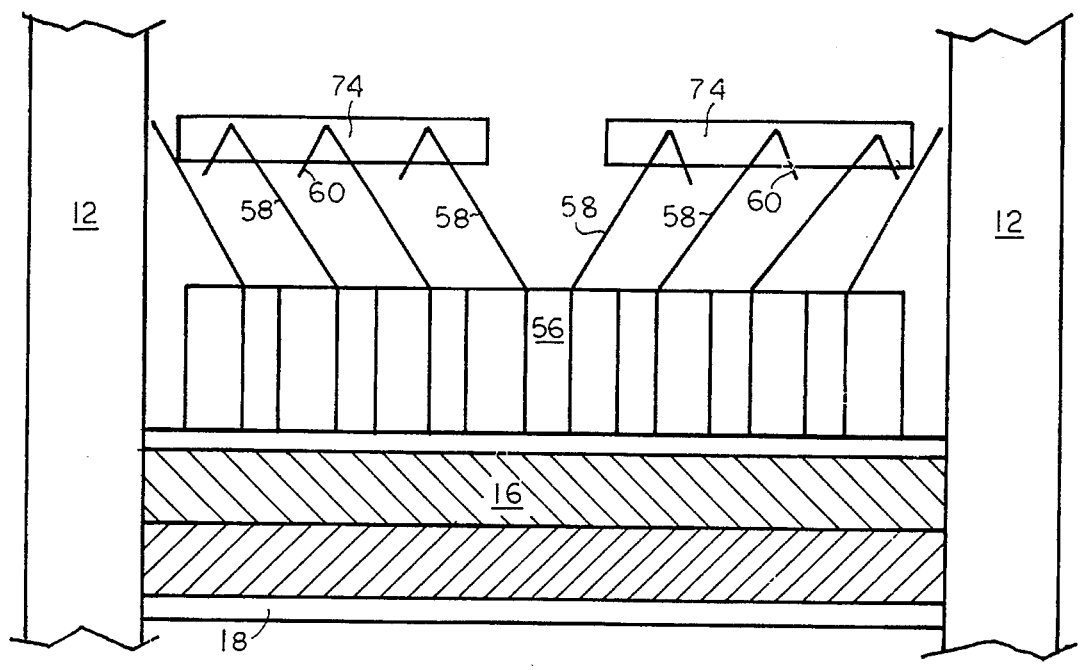
FIG. 5 is a side sectional view of the collector-distributor packed column of the invention.

The vanes 58 and vane extensions 60 are formed of integral bent sheet material, and have affixed thereon an plurality of vertically upright sheets 74 with an aligned series of slots 72 in the lower surfaces, which slots 72 provide for mechanical strengthening and enhanced rigidity of the vanes 58 and vane extensions 60. The use of the slots 72 in the upright strengthening sheet material 74 is illustrated in FIGS. 3 and 5 on only a portion of the device 52, for example, on the vanes 58 and extensions 60 on the upper left hand portion of FIG. 3. The strengthening of the vanes by material 74 may be employed on all or only some of the vanes 58 and extensions 60 as desired. The device 52 includes a ring wall wiper 76 with downward, inwardly-directed, scalloped edges to direct liquid onto the internal wall of column 12 into the device 52 as shown, in particular, in FIG. 3. FIG. 5 illustrates an enlarged plan view of the device 52 within a column 12.

The packed bed column with the integral collector-distributor device may be employed in a wide variety of exchange columns for the treatment of liquid or gas-liquid processing column, such as, for example, with a hydrocarbon liquid and hydrogen vapor as the gas stream.

Figure 6:
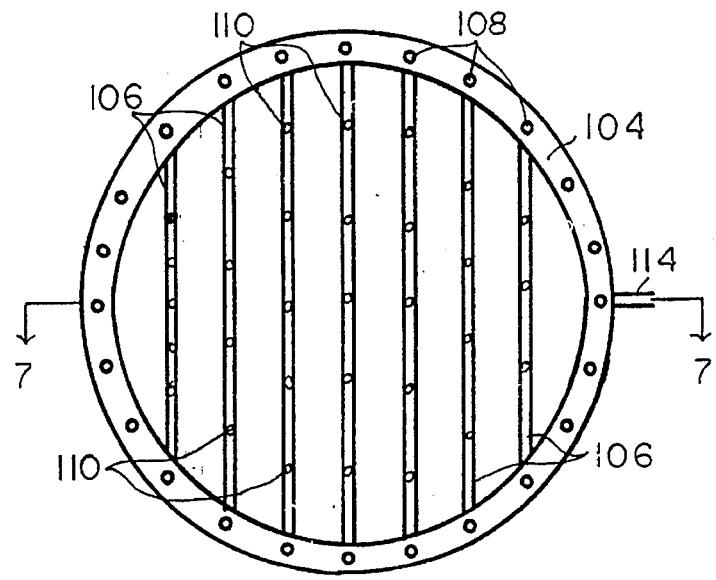
FIG. 6 is a schematic, illustrative, top plan view of another embodiment of the liquid collector-distributor of the invention in an exchange column.
Figure 7:
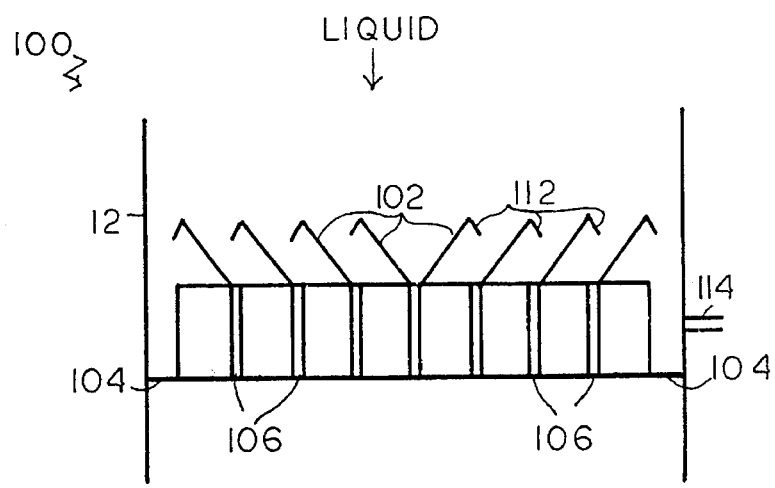
FIG. 7 is a sectional view along the line 7—7 of the embodiment in FIG. 6.

FIGS. 6 and 7 are directed to a liquid collector-distributor device 100 in the column space of an exchange column 12 wherein the device comprises a plurality of spaced-apart, parallel, lateral troughs 106 which extend substantially across the cross-sectional area of the column 12 and in open communication with an annular liquid sump ring 104 which receives downwardly flowing liquid along the internal walls of the column 12. The bottom column portion of the annular sump ring 104 is a recessed support ring modified for liquid distribution of the liquid therein, such as by holes 108 or other distribution means like drip tubes. Since the annular sump ring 104 will collect the liquid near the column 12 wall, a wall wiper 76, such as shown in FIGS. 2, 4, and 5 is not required. Further, in this embodiment, the liquid collector-distributor does not rest directly on the lower packed bed 16–18, but is spaced apart therefrom. Also, if required, a liquid also can be taken from the annular sump ring 104, preferably, for example, by the use of a plurality of spaced apart, elevated holes in the upper wall of the sump ring 104 or, if desired, one or more separate pipes 114 may be used to introduce or withdraw liquid into the sump ring 104 of the collector-distributor device.

The collector-distributor includes a plurality of spaced apart, generally parallel, upright-angled vane elements 102 with short, angled, downwardly extended vane extension elements 112 at the free end thereof. The vane elements 102–112, are secured to the top section of the lateral troughs 106, and extend at generally the same angles to cover the open spaces between the troughs 106 with the vane elements 102–112 on one side of the center line extending one way and on the other side extending the opposite way, to direct downward flowing liquid into the adjacent trough 106 and through distributor holes 110 or into the sump ring 104 by the last vane element on either side which may not require the vane extension element 112.

While a single collector-distributor device in each exchange column has been illustrated, it is recognized that an exchange column may contain a plurality of the collector-distributor devices within a plurality of separate column spaces alone or with other liquid collectors or liquid distributors and such devices may rest on a packing layer or be spaced apart therefrom. It is also recognized that the central channel distributor may be used with lateral troughs 106 extending therefrom.

What is claimed is:

1. A heat or mass transfer exchange column, which column comprises:

a) an inlet in the upper portion of the column for the introduction of a liquid;

b) an outlet in the lower portion of the column for the withdrawal of a treated liquid;

c) an inlet in the lower portion of the column for the introduction of a gas;

d) an outlet in the upper portion of the column for the withdrawal of a treated gas;

e) a plurality of heat or mass transfer sections in the column to include an upper section and a vertically spaced-apart lower section to define a space therebetween said sections; and f) an integral liquid collector-distributor means in the column space which means comprises:

i) liquid receiving means to receive downwardly flowing liquid;

ii) a plurality of spaced apart, generally parallel, lateral troughs to define an open space between troughs for the passage of upwardly flowing gas and the troughs extending substantially across the cross sectional area of the column and adapted to receive liquid from the liquid receiving means, and to distribute the liquid to the lower packed bed section, the lateral troughs each having spaced apart upward sides and an open top with side edges having upper edges and aperture means in the bottom or side walls of the troughs to distribute liquid to the lower packed bed section; and iii) liquid collection means to collect downwardly flowing liquid and to direct the liquid into the lateral troughs, which means includes a plurality of vane elements having a one and other end, the vane elements secured at the one end to the upper edge of one side of the lateral troughs and generally aligned parallel and extending upwardly at an angle to the longitudinal axis of the column and of sufficient length to cover substantially the open space between adjacent lateral troughs, and to provide generally vertical, laterally extending vapor open spaces between the other end of the vane elements and the upper edges of the side edges of the next adjacent trough for the passage of upwardly flowing gas, the vane elements adapted to receive on their upper angled surfaces the downwardly flowing liquid and to direct all or substantially all of the liquid into the lateral troughs to which side edge the vane element is secured.

2. The column of claim 1 which includes a wall wiper means positioned peripheral about the liquid collector-distributor means and below the upper packed bed section to receive and direct liquid on the internal wall of the packed column inwardly for collection and distribution by the liquid collector-distributor means.

3. The column of claim 2 wherein the wall wiper means comprises an inner ring on a column wall support means with a plurality of peripheral, directed, downwardly angled sections to direct the received liquid inwardly.

4. The column of claim 1 which includes a feed pipe means to introduce liquid directly into the distributor means.

5. The column of claim 1 wherein the vane elements are removably secured to the upper edges of the lateral troughs.

6. The column of claim 1 wherein the vane elements include at the other end short, downwardly angled vane extensions having an outer edge at the end of the vane extensions, the vane extensions to receive a small amount of the downwardly flowing liquid on their surface and to direct the received liquid to the next adjacent trough to which the vane elements are secured.

7. The column of claim 6 wherein the vane extensions have a plurality of drip points at the outer edge.

8. The column of claim 1 wherein the liquid receiving means includes a central liquid distributor channel extending across the diameter of the column and a plurality of the lateral troughs extending generally parallel and spaced apart to each other and perpendicularly outwardly from the central distributor channel.

9. The column of claim 8 which includes a center-most lateral trough extending from the central distributor channel and wherein the center-most lateral trough has upright sides and an open top and has vane elements extending outwardly from the center-most lateral trough on either of the upright sides, with generally parallel and diagonal upright vane elements extending at the same general angle outwardly in opposite directions from the lateral troughs on either side of the center-most lateral trough.

10. The column of claim 1 wherein the liquid receiving means includes an annular sump about the inside surface of the column and a plurality of generally parallel, spaced-apart lateral troughs extending across the cross-sectional area of the column and in liquid flow communication with the sump.

11. The column of claim 1 wherein the lateral troughs have a height of about 6 to 18 inches and the vane elements have a height of about 4 to 18 inches.

12. The column of claim 1 wherein the vane elements include a strengthening means to connect an upper section of the vane elements together and secure the vane elements in position.

13. The column of claim 12 wherein the strengthening means includes an elongated, upright, sheet support material with slots on the lower edge thereon to be secured onto an upper portion of the vane elements.

14. The column of claim 1 wherein the spaces between the lateral troughs range from about 3 to 12 inches and the width of the troughs range from about 1 to 6 inches.

15. The column of claim 1 wherein the lateral troughs include a plurality of overflow notches at the upper side edges.

16. The column of claim 1 wherein the upper and lower sections comprise random or structured packed beds.

17. The column of claim 1 wherein the means to distribute the liquid collected in the lateral troughs includes a plurality of distribution holes in the lateral troughs.

18. A method for the collection and distribution of a liquid in an exchange column, which method comprises:

a) introducing a liquid into the upper portion of the column;

b) introducing a gas into the lower section of the column;

c) withdrawing a treated liquid from the lower section of the column;

d) withdrawing a treated gas from the upper portion of the column;

e) positioning within the column at least two vertically spaced apart upper and lower mass or heat transfer sections to define a space therebetween said sections;

f) positioning a liquid distributor means to receive downwardly flowing liquid in the column space to include a plurality of spaced-apart, generally parallel lateral troughs, to define open spaces and extending across substantially the cross-sectional area of the column, the lateral troughs having upright sides and having upper edges and an open top, and each lateral trough having aperture means to distribute liquid in the lateral trough to the lower heat or mass transfer section;

g) collecting downwardly flowing liquid from the upper section of the column onto the surface of a plurality of generally parallel, aligned vane elements secured at one end to at least one side of the lateral troughs and angled upwardly and of sufficient length to extend substantially over the open spaces between adjacent lateral troughs and to provide generally laterally extending, vertical, open gas spaces between the other end of the vane elements and the upper edges of the next adjacent trough for the passage of an upwardly flowing gas and to receive downwardly flowing liquid onto the angled surface and to direct all or substantially all of the collected liquid into the lateral troughs to which the vane element is secured;

h) passing the upwardly flowing gas through the generally vertical, laterally extending open spaces; and i) distributing the collected liquid in the lateral trough by apertures in the bottom or side walls of the trough onto the next lower section.

19. An integral liquid collector-distributor device for use in an exchange column, which device comprises:

a) liquid receiving means to receive downwardly flowing liquid;

b) a plurality of spaced apart, generally parallel, lateral troughs to define open spaces with open tops between troughs for the passage of upwardly flowing gas and the troughs extending substantially across the cross sectional area of the column and adapted to receive liquid from the liquid receiving means, and to distribute the liquid to a lower packed bed section in the column, the lateral troughs each having spaced apart upward sides and an open top with side edges having upper side edges and aperture means in the bottom or side walls of the trough to distribute liquid to the lower packed bed section; and c) liquid collection means to collect downwardly flowing liquid and to direct the liquid into the lateral troughs, which means includes a plurality of single vane elements having a one and other end, the vane elements secured at the one end to the one upper edge of one side of the lateral troughs and generally aligned parallel and extending upwardly at an acute angle to the longitudinal axis of the column and of sufficient length to cover the open spaces between adjacent lateral troughs and to provide generally vertical, laterally extending, vapor, open spaces between the other end of the vane elements and the upper edges of the side edges of the next adjacent trough for the passage of upwardly flowing gas, the vane elements adapted to receive on their upper angled surfaces the downwardly flowing liquid and to direct all or substantially all of the liquid into the lateral troughs to which side edge the vane element is secured.

* * * * *